US012800608B2

(12) United States Patent
Giambastiani et al.

(10) Patent No.: US 12,800,608 B2
(45) Date of Patent: Nov. 17, 2026

(54) DUAL-SEALED ACCELEROMETER WITH CAVITY PRESSURE MONITORING

(71) Applicant: InvenSense, Inc., San Jose, CA (US)

(72) Inventors: Adolfo Giambastiani, Lucca (IT); Luca Coronato, Corsico (IT); Edoardo Belloni, Milan (IT); Stefano Dellea, Sesto san Giovanni (IT); Yaoching Wang, San Jose, CA (US); Giacomo Gafforelli, Casatenovo (IT)

(73) Assignee: InvenSense, Inc., San Jose, CA (US)

( * ) Notice: Subject to any disclaimer, the term of this patent is extended or adjusted under 35 U.S.C. 154(b) by 309 days.

(21) Appl. No.: 18/495,096

(22) Filed: Oct. 26, 2023

(65) Prior Publication Data

US 2024/0183877 A1 Jun. 6, 2024

Related U.S. Application Data

(60) Provisional application No. 63/469,118, filed on May 26, 2023, provisional application No. 63/430,259, filed on Dec. 5, 2022.

(51) Int. Cl.

| | |
|---|---|
| ***G01P 15/12*** | (2006.01) |
| ***G01F 15/12*** | (2006.01) |
| ***G01P 1/00*** | (2006.01) |
| ***G01P 15/18*** | (2013.01) |
| ***G01P 21/00*** | (2006.01) |

(52) U.S. Cl.

CPC ................ *G01F 15/12* (2013.01); *G01P 1/00* (2013.01); *G01P 15/18* (2013.01); *G01P 21/00* (2013.01)

(58) Field of Classification Search

CPC ........................................................ G01P 15/12
USPC ........................................................... 73/1.38
See application file for complete search history.

(56) References Cited

U.S. PATENT DOCUMENTS

| | | | | |
|---|---|---|---|---|
| 10,041,854 | B2 | 8/2018 | Coronato et al. | |
| 10,209,157 | B2 | 2/2019 | Coronato et al. | |
| 10,308,503 | B2 | 6/2019 | Shin et al. | |
| 2010/0242600 | A1* | 9/2010 | Lin ......................... | G01P 15/18 73/514.32 |
| 2015/0111332 | A1* | 4/2015 | Lee ..................... | B81C 1/00269 438/51 |
| 2015/0160089 | A1* | 6/2015 | Dawson ................ | B81C 99/003 73/1.59 |

(Continued)

FOREIGN PATENT DOCUMENTS

| | | |
|---|---|---|
| CN | 108369098 A | 8/2018 |

OTHER PUBLICATIONS

Chang et al. "CMOS-MEMS multi-sensor single chip with high heat dissipation and low-temperature hermetic sealing." 2021 IEEE International Electron Devices Meeting (IEDM). IEEE, 2021. (Year: 2021).*

(Continued)

*Primary Examiner* — Walter L Lindsay, Jr.
*Assistant Examiner* — Philip T Fadul
(74) *Attorney, Agent, or Firm* — Van Hoven PC; Joshua Van Hoven

(57) ABSTRACT

A MEMS accelerometer package includes multiple cavities such that a change in pressure corresponding to a breach in one or more of the cavities is readily identified based on the output of a pressure-sensitive sensor such as a MEMS resonator. One or more mitigations may be initiated in response to the identification of the change in pressure.

20 Claims, 8 Drawing Sheets

(56) References Cited

U.S. PATENT DOCUMENTS

| | | | | |
|---|---|---|---|---|
| 2017/0167946 | A1* | 6/2017 | Coronato | ............ B81C 99/0045 |
| 2018/0346321 | A1 | 12/2018 | Takubo et al. | |

OTHER PUBLICATIONS

Office Action for Taiwan Application No. 112147144, dated Jun. 30, 2025, 23 Pages.

Chang C Y et al: "CMOS-MEMS multi-sensor single chip with high heat dissipation and low-temperature hermetic sealing", 2021 IEEE International Electron Devices Meeting (IEDM), IEEE, Dec. 11, 2021 (Dec. 11, 2021), XP034096899, DOI: 10.1109/IEDM19574.2021.9720536 [retrieved on Feb. 23, 2022] abstract and sections I "Introduction", IV "Conclusion".

Communication Relating to the Results of the Partial International Search in relation to International Application No. for PCT application No. PCT/US2023/081719, dated Mar. 28, 2024, 13 pages.

International Search Report and Written Opinion of the International Searching Authority in relation to International Application No. for PCT application No. PCT/US2023/081719, dated May 22, 2024, 18 pages.

* cited by examiner

DUAL-SEALED ACCELEROMETER WITH CAVITY PRESSURE MONITORING

CROSS-REFERENCE TO RELATED APPLICATIONS

This application claims priority to U.S. Provisional Patent Application No. 63/430,259, entitled "DUAL-SEALED ACCELEROMETER WITH CAVITY PRESSURE MONITORING" and filed on Dec. 5, 2022, and U.S. Provisional Patent Application No. 63/469,118, entitled "SEPARATED CAVITY FOR 2D/3D ACCELEROMETER" and filed on May 26, 2023, each of which is incorporated by reference herein in its entirety.

BACKGROUND

Numerous items such as smart phones, smart watches, tablets, automobiles, aerial drones, appliances, aircraft, exercise aids, and game controllers may utilize sensors such as microelectromechanical system (MEMS) sensors during their operation. In many applications, various types of motion sensors such as accelerometers and gyroscopes may be analyzed independently or together in order to determine varied information for particular applications. For example, gyroscopes and accelerometers may be used in gaming applications (e.g., smart phones or game controllers) to capture complex movements by a user, drones and other aircraft may determine orientation based on gyroscope measurements (e.g., roll, pitch, and yaw), and vehicles may utilize measurements for determining direction (e.g., for dead reckoning) and safety (e.g., to recognizing skid or roll-over conditions).

MEMS sensors may be designed with a hermetically sealed cavity with a cavity pressure for a particular application. For example, a MEMS accelerometer or a MEMS gyroscope has MEMS components entirely enclosed within a cavity having a particular pressure, while a MEMS sensor such as a MEMS microphone or MEMS pressure sensor may include a membrane exposed to a volume that changes in response to a force of interest on one side and a back volume exposed to a particular pressure on the other side. MEMS sensors may thus be designed to operate based on an expected pressure environment within an acceptable tolerance. A change in this expected pressure may cause inaccurate measurement of the force of interest.

SUMMARY

In an embodiment of the present disclosure, a microelectromechanical system (MEMS) accelerometer comprises at least one MEMS accelerometer structure located within a first sealed cavity, the first sealed cavity having a first initial pressure within a first volume defined by a cap, a substrate, and a first bonded exterior wall. The MEMS accelerometer may further comprise a second sealed cavity surrounding the first bonded exterior wall and defined by the cap, the substrate, and a second bonded exterior wall, wherein a second initial pressure of the second sealed cavity is less than the first initial pressure and lower than atmospheric pressure. The MEMS accelerometer may further comprise a sensor located within the second sealed cavity and configured to output a signal that changes based on a change in pressure within the second sealed cavity and processing circuitry configured to receive the signal and to identify a break in a sealing of the first sealed cavity based on the change in the pressure within the second sealed cavity.

In an embodiment of the present disclosure, a microelectromechanical system (MEMS) accelerometer comprises a first MEMS accelerometer structure located within a first sealed cavity, the first sealed cavity having a first initial pressure within a first volume defined by a cap, a substrate, and a first bonded exterior wall, wherein the first initial pressure is different from atmospheric pressure. The MEMS accelerometer may further comprise a second MEMS accelerometer structure located within a second sealed cavity, the second sealed cavity having a second initial pressure that is identical to the first initial pressure, within a second volume defined by the cap, the substrate, and a second bonded exterior wall. The MEMS accelerometer may further comprise a first sensor located within the first sealed cavity and configured to output a first signal that changes based on a first change in pressure from the first initial pressure within the first sealed cavity and a second sensor located within the second sealed cavity and configured to output a second signal that changes based on a second change in pressure from the second initial pressure within the second sealed cavity. The MEMS accelerometer may further comprise processing circuitry configured to receive the first signal and the second signal and to identify a break in a sealing of one of the first sealed cavity or the second sealed cavity based on a comparison of the first signal and the second signal.

In an embodiment of the present disclosure, a method for identifying a breach of a microelectromechanical system (MEMS) accelerometer cavity comprises receiving a first output signal at a first time from a first sensor located within a first sealed cavity having a first initial pressure, wherein the first sealed cavity has a first bonded exterior wall that surrounds a second bonded exterior wall, wherein the second bonded exterior wall defines a second sealed cavity having a second initial pressure, wherein the first initial pressure of the first sealed cavity is less than the second initial pressure and lower than atmospheric pressure. The method may further comprise associating the first output signal with the first initial pressure, receiving a second output signal at a second time from the first sensor, comparing the second output signal to the first output signal, and determining, based on the comparison, that one of the first cavity or the second cavity has been breached.

BRIEF DESCRIPTION OF DRAWINGS

The above and other features of the present disclosure, its nature, and various advantages will be more apparent upon consideration of the following detailed description, taken in conjunction with the accompanying drawings in which.

DETAILED DESCRIPTION

Figure 1:
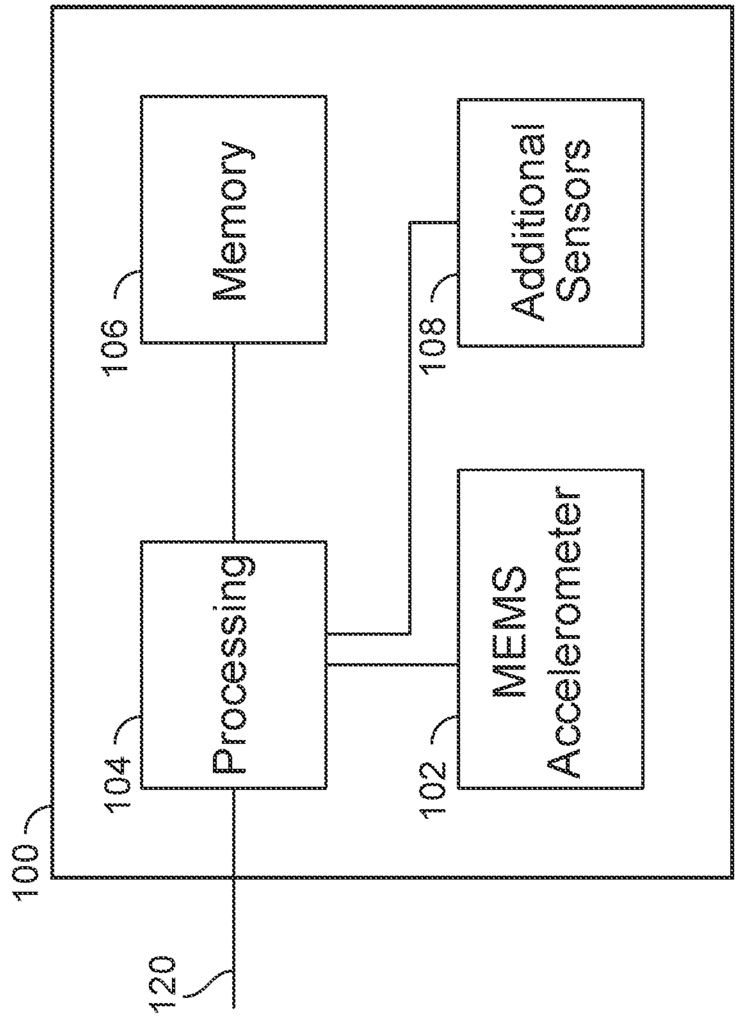
FIG. 1 shows an illustrative MEMS system in accordance with an embodiment of the present disclosure.

A MEMS accelerometer may include multiple MEMS accelerometer structures, each of which includes one or more proof masses that move in a direction of interest (e.g., in a MEMS plane or out of a MEMS plane) relative to fixed sensing components (e.g., fixed electrodes located within the MEMS plane or on a substrate or cap parallel to the MEMS plane) to measure a force of interest. The pressure within the environment that the MEMS structures operate impacts the movement of the proof masses based on the air resistance to the movement of the proof masses, which generally increases with an increase in pressure. Accordingly, the MEMS accelerometer structures within a MEMS accelerometer package are located in hermetically sealed cavities that are set to a predetermined initial cavity pressure in accordance with the sensor design.

A MEMS accelerometer (e.g., a MEMS accelerometer package) may be subject to significant environmental and physical stresses during operation in a device in an end-use application, including substantial changes in temperature, external air pressure, and humidity/moisture in the operating environment as well and bending, shocks, and other loads during assembly with other components or use in the end-use device. Although some of these stresses may result in incremental changes to a pressure within a sealed cavity containing a MEMS accelerometer structure (e.g., due to temperature causing expansion or contraction of a gas within the cavity), in the absence of a break of the hermetic seal defining the cavity the levels of moisture within the cavity should not change nor should large changes in pressure occur. However, if the cavity is breached, and depending on the size of the breach and the rate of exchange of gases, the pressure within the non-sealed cavity will eventually equalize to that of the exterior environment. Furthermore, even if the pressure does not change significantly (e.g., where the initial pressure of the MEMS accelerometer cavity is near an atmospheric pressure) due to a breach in the accelerometer cavity, contaminants and moisture may enter the cavity and interact with the MEMS accelerometer, electrodes, and other associated circuitry, resulting in immediate changes such as additional stiction of movable MEMS components and changes in electrical responses of electrodes and other components as well as accelerated degradation of the MEMS components.

A MEMS accelerometer may include multiple cavities as well as pressure-sensitive sensors to monitor for breaches in MEMS accelerometer cavities. In an example configuration, one or more MEMS sensor are located within a first cavity having a first pressure. A second cavity surrounds the first cavity, and has a different (e.g., higher or lower pressure) than both the pressure within the first cavity and the pressure within an external environment to the second cavity. A simple pressure-sensitive sensor such as a MEMS resonator is located in the second cavity and has an output that changes when the pressure within the second cavity changes, which in turn is indicative of either a breach between the first cavity and the second cavity or the second cavity and the external environment. When such a change in pressure is sensed, and in some examples, based on the characteristics of the change in pressure (e.g., relatively slow change in pressure, fast change in pressure, identification as exposure to the external environment, identification as breach between first cavity and second cavity, etc.), mitigating actions may be employed such as modification of sensor outputs, generation of warnings or error messages, or compensation based on other sensors.

An example configuration of multiple MEMS cavities may include at least two MEMS accelerometer structures with one of the MEMS accelerometer structures located in a first cavity and another MEMS accelerometer structure located in a second cavity, where each cavity is separate from the other. Each cavity includes a pressure-sensitive component such as a MEMS resonator. The outputs of the pressure-sensitive components are compared to each other to identify relative changes in output that are indicative of a breach of one of the cavities. In some configurations, the components, their locations, and their orientations may be selected such that the pressure-sensitive components are initially subject to close to identical conditions of cavity volume, initial cavity pressure, location within the cavity, and location on the MEMS accelerometer package.

FIG. 1 shows an illustrative MEMS system 100 in accordance with an embodiment of the present disclosure. Although particular components are depicted in FIG. 1, it will be understood that other suitable combinations of the MEMS, processing components, memory, and other circuitry may be utilized as necessary for different applications and systems. In accordance with the present disclosure, the MEMS system may include a MEMS accelerometer as well as additional sensors 108. Although the present disclosure will be described in the context of signals received from MEMS accelerometers having multiple cavities for sensing of a change in pressure within a hermetically sealed cavity of one or more of the MEMS accelerometers, it will be understood that the multi-cavity pressure sensing systems and methods of the present disclosure may be utilized with other MEMS sensors having sealed operating environments expected to operate at a particular pressure.

Processing circuitry 104 may include one or more components providing processing based on the requirements of the MEMS system 100. In some embodiments, processing circuitry 104 may include hardware control logic that may be integrated within a chip of a sensor (e.g., on a base substrate of a MEMS accelerometer 102 or other sensors 108, or on an adjacent portion of a chip to the MEMS accelerometer 102 or other sensors 108) to control the operation of the MEMS accelerometer 102 or other sensors 108 and perform aspects of processing for the MEMS accelerometer 102 or the other sensors 108. In some embodiments, the MEMS accelerometer 102 and other sensors 108 may include one or more registers that allow aspects of the operation of hardware control logic to be modified (e.g., by modifying a value of a register). In some embodiments, processing circuitry 104 may also include a processor such as a microprocessor that executes software instructions, e.g., that are stored in memory 106. The microprocessor may control the operation of the MEMS accelerometer 102 by interacting with the hardware control logic and processing signals received from MEMS accelerometer 102. The microprocessor may interact with other sensors 108 in a similar manner. In some embodiments, some or all of the functions of the processing circuitry 104, and in some embodiments, of memory 106, may be implemented on an application specific integrated circuit ("ASIC") and/or a field programmable gate array ("FPGA").

Although in some embodiments (not depicted in FIG. 1), the MEMS accelerometer 102 or other sensors 108 may communicate directly with external circuitry (e.g., via a serial bus or direct connection to sensor outputs and control inputs), in an embodiment the processing circuitry 104 may process data received from the MEMS accelerometer 102 and other sensors 108 and communicate with external components via a communication interface 110 (e.g., a serial peripheral interface (SPI) or I2C bus, in automotive applications a controller area network (CAN) or Local Interconnect Network (LIN) bus, or in other applications a suitably wired or wireless communications interface as is known in the art). The processing circuitry 104 may convert signals received from the MEMS accelerometer 102 and other sensors 108 into appropriate measurement units (e.g., based on settings provided by other computing units communicating over the communication interface 110) and perform more complex processing to determine measurements such as orientation or Euler angles, and in some embodiments, to determine from sensor data whether a particular activity (e.g., walking, running, braking, skidding, rolling, etc.) is taking place. In some embodiments, some or all of the conversions or calculations may take place on the hardware control logic or other on-chip processing of the MEMS accelerometer 102 or other sensors 108.

In some embodiments, certain types of information may be determined based on data from multiple MEMS gyroscopes 102 and other sensors 108 in a process that may be referred to as sensor fusion. By combining information from a variety of sensors it may be possible to accurately determine information that is useful in a variety of applications, such as image stabilization, navigation systems, automotive controls and safety, dead reckoning, remote control and gaming devices, activity sensors, 3-dimensional cameras, industrial automation, and numerous other applications.

In embodiments of the present disclosure, one or more MEMS accelerometers may be located within a hermetically sealed cavity that may have an initial (e.g., designed) pressure. One or more proof masses of the MEMS accelerometer respond to a force of interest (e.g., linear acceleration along one of an x-axis, y-axis, or z-axis) by moving relative to a fixed measurement component such as one or more sense electrodes that form one or more capacitors with the one or more proof masses, although proof mass movement due to a force of interest may be sensed by other methodologies such as piezoelectric or resistive sensing. Measurement of acceleration is based on the measured changes (e.g., capacitance, piezoelectric, resistance) such that expected changes correspond to a particular force. However, a change in pressure (e.g., increase or decrease in pressure) changes the response of the proof mass, with an increase in pressure damping the movement of the proof mass and a decrease in pressure facilitating increased movement in response to the force of interest. Accordingly, multiple cavities are used to detect changes in pressure within the MEMS accelerometer cavity. In some embodiments, a second cavity surrounds the cavity of the one or more MEMS sensors and includes a sensor (e.g., a MEMS resonator, MEMS pressure sensor, or Pirani gauge) that measures pressure in the second (e.g., surrounding) cavity. If the seal of the cavity of the MEMS accelerometer is broken, a change in pressure will equalize between the MEMS accelerometer cavity and the surrounding pressure sensing cavity. This will result in a MEMS sensor within the surrounding cavity directly (e.g., by a MEMS pressure sensor directly detecting pressure) or indirectly (e.g., by a MEMS resonator or Pirani gauge changing an output signal due to pressure-sensitive operation) sensing the change in pressure, which in turn my be used by the processing circuitry to modify the operation of one or more of the MEMS accelerometers (e.g., by changing scaling factors or signal filtering), create alarms or notifications, and/or initiate corrective action. In some embodiments, multiple MEMS accelerometers may each be located in separate MEMS cavities and have an associated pressure-sensing component (e.g., MEMS resonator, MEMS pressure sensor, or Pirani gauge) co-located within the sensor cavity with each respective MEMS accelerometer in its associated cavity. Output signals of the pressure-sensing components may have a known relationship when the pressure levels within the cavities are at an initial desired level. A change in this relationship during operation, or a large absolute change in the outputs of multiple pressure-associated output signals indicates that the pressure in one or more of the MEMS accelerometer cavities has changed. The processing circuitry may modify the operation of one or more of the MEMS accelerometers (e.g., by changing scaling factors or signal filtering), create alarms or notifications, and/or initiate corrective action.

Figure 2:
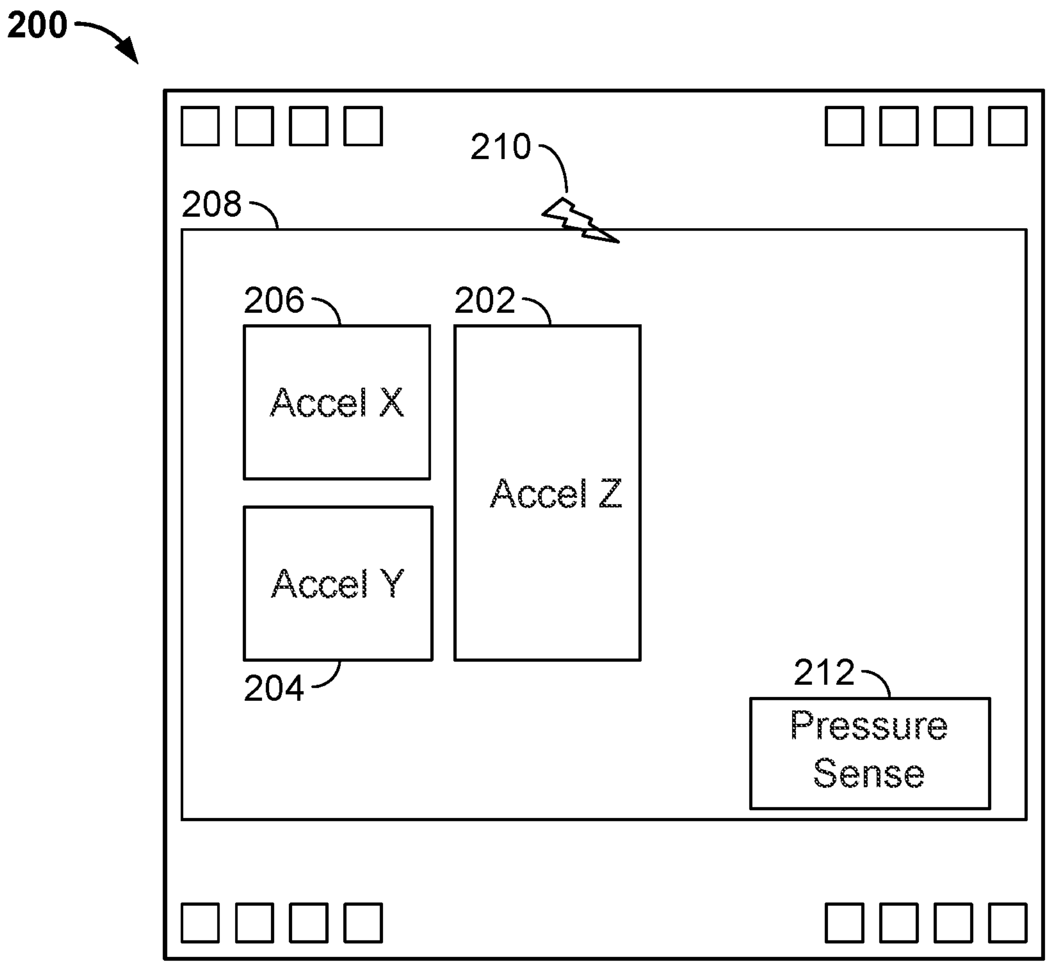
FIG. 2 depicts an exemplary MEMS accelerometer package in accordance with an embodiment of the present disclosure.

FIG. 2 depicts an exemplary MEMS accelerometer package in accordance with an embodiment of the present disclosure. Although FIG. 2 will be described in the context of a particular application and system components, it will be understood that the present disclosure may be utilized with a variety of MEMS sensor types and configurations. In the exemplary embodiment depicted in FIG. 2, a MEMS accelerometer 200 is a three-axis MEMS accelerometer including a z-axis (e.g., out-of-plane) accelerometer 202, y-axis (e.g., in-plane sensing along a first direction) accelerometer 204, and a z-axis (e.g., in-plane sensing along a second direction perpendicular to the first direction) accelerometer 206. The movable components of each of the MEMS accelerometers 202-206 may be fabricated within a common MEMS layer, with a common cap and common substrate layer shared by the MEMS accelerometers in an exemplary embodiment, although MEMS accelerometers may be separately manufactured on different wafers/layers in some embodiments.

All three of the MEMS accelerometers 202-206 are located within and surrounded by a shared cavity 208, such that each of the MEMS accelerometers 202-206 operates in the same pressure environment, for example, with a designed pressure applied during manufacturing (e.g., at or near atmospheric pressure or greater than atmospheric pressure). In an exemplary embodiment, the cavity is defined by the shared cap, shared substrate, and a bonded exterior wall between the shared cap and shared substrate, defining the interior volume of the cavity 208.

During operation, an exterior surface of the cavity 208 may become fully or partially exposed due to damage 210 to a surface forming the cavity (e.g., a cap, substrate, MEMS wafer, or bonding surface). Such damage may have a variety of causes such as catastrophic shocks applied to the MEMS accelerometer package 200 such as due to mishandling of an end product, errors that occur during manufacturing or assembly with an end product, as well as gradual damage for example due to lengthy use of the MEMS accelerometer package 200 in harsh environments including ranges of heat, humidity, exposure to moisture, or exposure to chemical environments. However damage 210 is incurred, the result may be a loss in a seal of the cavity 208 to the external environment and exposure of the MEMS accelerometers 202-206 to the external environmental conditions. In some instances, this will result in a change in pressure of the operating environment of the MEMS accelerometers 202-206, changing the damping of the sensor proof mass movements and resulting in inaccurate acceleration outputs.

One manner of mitigating the impact of a change in pressure due to a breach of the cavity 210 may be to include within the cavity 208 a pressure-sensitive component 212 (e.g., that is operated in a manner such that a primary response of the component is to a change in pressure) such as a MEMS resonator, MEMS pressure sensor, or Pirani gauge. If a change in pressure is sensed, the operation of the MEMS accelerometers 202-206 may be modified (such as adjusting a scaling of output signals due to known relationships of pressure to proof mass movement), warnings or errors may be generated, or other corrective action (e.g., employing other sensors to approximate and/or check the accelerometer output) may be taken. Nonetheless, even if after equalization of pressure, the interior pressure of the cavity 208 may not be significantly changed from designed conditions, for example, if the cavity 208 has a designed pressure that is expected to be at or near atmospheric pressure. In such a condition, even a pressure-sensitive component 212 may not sense a significant change in pressure despite a breach in the seal of cavity 208. The pressure-sensitive component may continue to output a similar output signal even as the external environment causes damage or degradation to the MEMS accelerometers 202-206, such as by exposing the movable and electronic components of the accelerometers to moisture, resulting in stiction of movable components and degradation of exposed electrical components.

Figure 3:
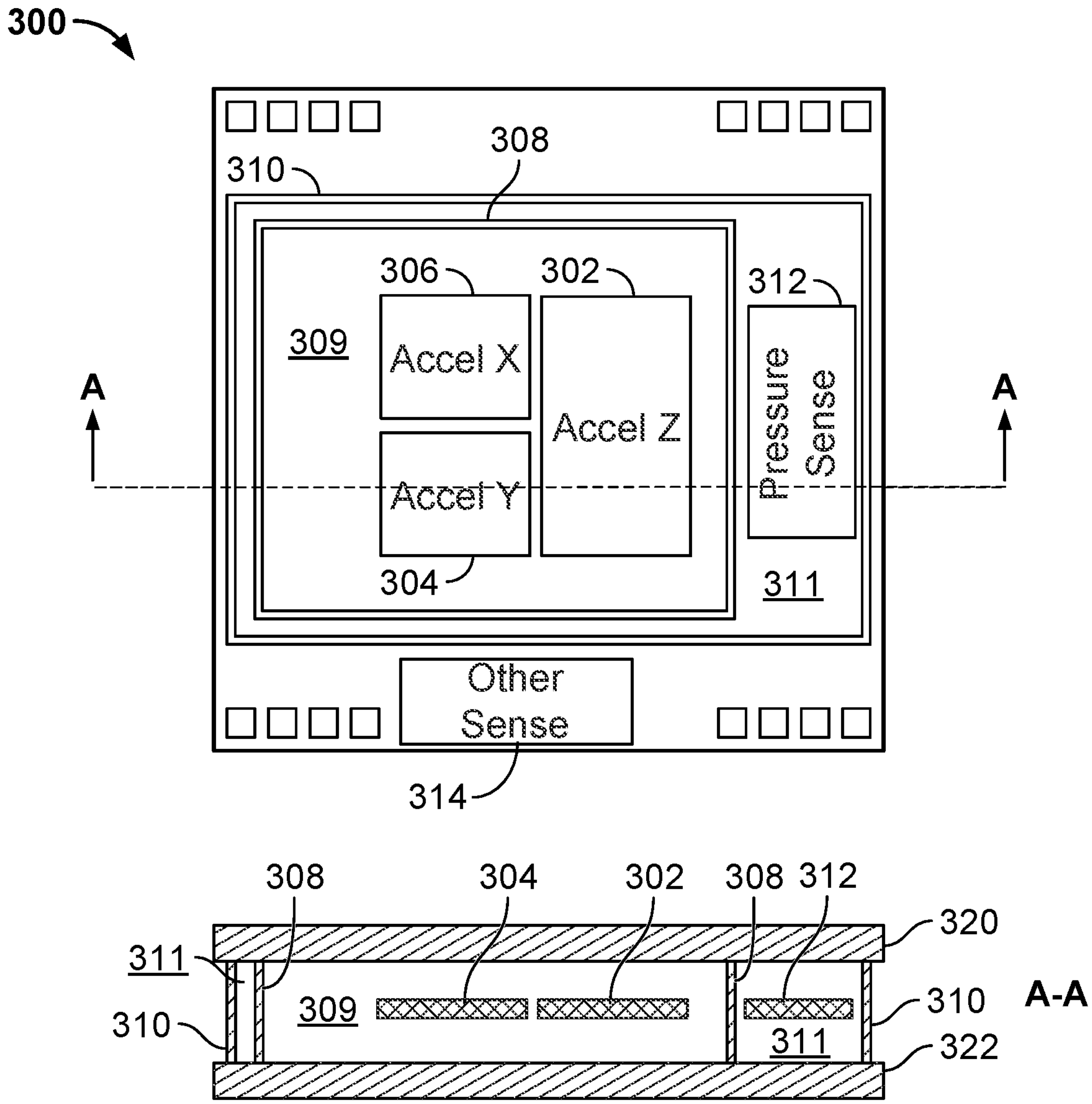
FIG. 3 depicts an exemplary MEMS accelerometer package including a pressure sensing cavity in accordance with an embodiment of the present disclosure.

FIG. 3 depicts an exemplary MEMS accelerometer package 300 including a pressure sensing cavity in accordance with an embodiment of the present disclosure. A section view A-A of the MEMS accelerometer package 300 is also depicted in FIG. 3. Although FIG. 3 will be described in the context of a particular application and system components, it will be understood that the present disclosure may be utilized with a variety of MEMS sensor types, MEMS accelerometer configurations (e.g., from one to any number of axes), manufacturing techniques and component configurations (e.g., shared cap and substrate as described, and/or multiple combined or bonded dies or chips), pressure sensing techniques (e.g., direct and/or indirect techniques), and additional sensors (e.g., temperature, moisture, etc.), whether or not specifically depicted herein. Although particular components are depicted and described in FIG. 3, it will be understood that components may be added, removed, substituted, or modified in accordance with the present disclosure. For example, in some embodiments multiple pressure-sensitive sensors (e.g., having different resolutions) may be included within the pressure sensing cavity, additional sensors (e.g., temperature or moisture sensors) may be included within or outside of the pressure sensing cavity, multiple pressure sensing cavities may collectively surround the MEMS accelerometers, or there may be multiple levels of nested pressure sensing cavities. In the example depicted in FIG. 3, a three axis MEMS accelerometer package 300 (e.g., including z-axis accelerometer 302, y-axis accelerometer 304, and x-axis accelerometer 306) may be surrounded by exterior wall 308, cap 320, and substrate 322 to define a first cavity 309. A pressure-sensitive sensor 312 is located within a second cavity 311 that entirely surrounds first cavity 309 and is defined by exterior walls 308 and 310, cap 320, and substrate 322. In the embodiment depicted in FIG. 3, an additional sensor 314 (e.g., a temperature sensor) is located outside of and proximate to exterior wall 310.

As can be seen by cutaway view A-A, in the embodiment depicted herein the MEMS accelerometers 302 and 304 (as well as MEMS accelerometer 306, not depicted) include proof masses that are suspended within and entirely surrounded by a shared cavity 309, which in turn is defined by a shared cap 320, shared substrate 322, and an exterior wall 308. In other embodiments, not depicted in FIG. 3, one or more of the accelerometers may have its own cavity that is independently defined with respect to another accelerometer cavity(ies), for example, with additional exterior wall(s) and/or unique (e.g., not shared) caps and substrates coupled (e.g., bonded) together. For example, multiple MEMS accelerometer dies having independent cavities may be bonded to a common cap and/or substrate and surrounded by a common exterior cavity 311. Returning to the embodiment of FIG. 3, in view of the size and construction of respective MEMS accelerometer components defining the cavity 309, it may be most likely that breach of volume defining cavity 309 occurs at a portion of the exterior wall 308. In the absence of mitigation measures as described in this FIG. 3, such a breach may result in an undesirable change in the environment within cavity 309, such as a change in pressure, humidity, moisture content, and the like.

Although the present disclosure may be described in the context of accelerometers packages measuring acceleration along multiple axes, in some embodiments multiple accelerometers measuring different acceleration ranges along a common axis may be included in the MEMS accelerometer package. For example, multiple MEMS accelerometers may be included that are optimized to sense different ranges of acceleration, for example, in complex systems where different ranges of acceleration correspond to different sensed phenomena (e.g., in a vehicle, mid-high G for airbag applications along with low-G for motion detection and stabilization). For example, the MEMS accelerometer structures may include a low-G accelerometer (e.g., less than 30 Gee), a medium-G accelerometer (e.g., from 30 Gee to 120 Gee), and a high-G accelerometer (e.g., greater than 120 Gee). Thus, a sensor package may include multiple MEMS accelerometers along each sensing axis, resulting in 4, 6, 9, or other total numbers of accelerometers depending on the number of axes of sensing and the different ranges of acceleration sensed along each axis. In some such embodiments, multiple accelerometer-containing cavities and pressure sensing cavities may be nested, for example, such that breach of a single cavity does not disable all of the MEMS accelerometers while the cavity that is breached can be identified.

The entirety of exterior bonded wall 308 is surrounded by exterior bonded wall 310, such that in the embodiment depicted in FIG. 3 the exterior cavity 311 is defined by the volume between exterior bonded wall 310, exterior bonded wall 308 (which in the context of cavity 311, defines the interior boundary of the volume of cavity 311), cap 320, and substrate 322. Although the bonded walls 310 and 308 are depicted as unitary components extending between a cap 320 and substrate 322, it will be understood that the wall may be formed by multiple components and extensions therefrom, such as a portion of a cap layer that partially extends toward a substrate layer, a portion of a substrate layer that extends toward a cap layer, and a MEMS layer bonded to each of the cap and substrate layer. In this manner, cavity 311 surrounds cavity 309, such that any breach in exterior bonded wall 308 will result in a passage between cavity 309 and cavity 311, eventually resulting in the equalization of pressure between these cavities. Exterior bonded wall 310 of cavity 311 is exposed on the other side to the external environment, which in most end-use applications will be at or near atmospheric pressure. A breach in the exterior bonded wall 310 will thus create a passage between cavity 311 and the external environment, eventually resulting in cavity 311 reaching a pressure of the external environment as pressure equalizes with cavity 311.

A pressure-sensitive sensor 312 is located inside of cavity 311 and outputs a signal that changes according to the pressure inside of cavity 311. Initial pressures for each of cavities 309 and 311 may be selected in accordance with the particular sensors and end-use application in a manner such that the pressure of cavity 311 changes substantially in response to equalization of pressure within cavity 311 due to a breach of exterior bonded wall 308 (e.g., indicating that cavity 309 has been breached and is exposed to cavity 311) or a breach of exterior bonded wall 310 (e.g., indicating that cavity 311 is exposed to the internal environment). In an embodiment in which the MEMS sensors within the cavity 309 are MEMS accelerometers 302-306 having an initial pressure near atmospheric pressure, and the end-use application will expose the 3-axis MEMS accelerometer to an environment likely to be at or near atmospheric pressure, the initial pressure within cavity 311 may be selected such that exposure to either the cavity 309 or external environment will result in a substantial (e.g., greater than 10%) change in the pressure within cavity 311. Although the initial pressure may be greater than or less than atmospheric pressure, in an embodiment the initial pressure of cavity 311 may be less than atmospheric pressure such that a breach of either external bonded wall 308 or external bonded wall 310 will result in an increase of pressure within cavity 311. For example, the initial pressure within cavity 311 may be less than half of the pressure within cavity 309, or an order of magnitude less than the pressure within cavity 309.

Although a variety of respective volumes (e.g., an equal volume or other volume differential) may be utilized, in some implementations, the respective volumes of cavities 309 and 311 may be selected such that the volume of cavity 309 is greater than the volume of cavity 311. For example, the volume of cavity 309 can be at least twice the volume of cavity 311. In addition to reducing the volume of cavity 311 by minimizing the area between exterior bonded wall 308 and exterior bonded wall 310, another manner of minimizing the volume within cavity 311 may be to include a cap 320 that extends further into cavity 311 (e.g., by not having openings patterned in the cap in comparison to MEMS accelerometers 302-306). In this manner, when pressure equalizes between cavity 309 and 311 the resulting pressure (and rate of change of pressure) will be greater than if the cavities 309 and 311 have similar volumes. Facilitating a greater change in pressure and rate of change in pressure within cavity 311 due to a breach of exterior bonded wall 308 allows less sensitive pressure detection techniques for pressure-sensitive sensor 312, resulting in the usage of less space for the cavity 311 as well as more efficient power usage and lower requirements for signal post-processing. In this manner, a relatively simple pressure-responsive sensor such as a MEMS resonator, MEMS pressure sensor, or Pirani gauge may be used.

In an exemplary embodiment where the pressure-sensitive sensor 312 is a MEMS resonator, the MEMS resonator may include one or more patterned suspended plates within a MEMS layers that are provided an appropriate signal (e.g., periodic signal having a certain amplitude and frequency) via one or more drive components (e.g., a drive electrodes) that cause the MEMS resonator to move in a predetermined manner under normal operating conditions, for example, with the cavity 311 having the initial pressure specified for sensing a change in pressure within cavity 311. For example, the MEMS resonator may be forced to resonance by a drive signal from the processing circuitry to cause a movement of the MEMS resonator. The movement of the MEMS resonator in response to the drive signal may be monitored, for example to directly measure the motion of the MEMS resonator or to determine other characteristics of the MEMS resonator such as Q factor. A change in pressure within the cavity 311 results in changes to the MEMS resonator drive signal (e.g., in a feedback system, requiring increased or decreased drive amplitude), sense signal, or Q factor. The power of the drive signal increases with an increase of pressure within cavity to maintain the movement of the MEMS resonator, such that the processing circuitry can identify the change in the pressure based on the increased power of the drive signal. As another example, the MEMS resonator may be periodically forced to oscillation by a drive signal from the processing circuitry and once a desired level of oscillation is reached by the MEMS resonator the driving signal may switched off such that the processing circuitry measures a decay time for the MEMS resonator to decay from the forced oscillation, which will be less (e.g., faster decay) under higher pressure conditions. The processing circuitry may then identify the change in the pressure based on the decay time.

However the pressure is determined from the MEMS resonator, when the rate of change or absolute value of the pressure-sensitive MEMS resonator value changes by more than a threshold, a breach in an exterior bonded wall of the MEMS accelerometer may be determined. In some embodiments, it may be possible to distinguish between breaches in the exterior bonded wall 308 (e.g., between cavity 309 and cavity 311) and exterior bonded wall 310 (e.g., between cavity 311 and the external environment) as a breach in exterior bonded wall 308 should not result in the pressure within cavity 311 reaching atmospheric pressure. In this manner, a relatively simple and low-power MEMS resonator may be utilized to identify breaches in the integrity of the cavities of the MEMS accelerometer.

In an exemplary embodiment where the pressure-sensitive sensor 312 is a MEMS pressure sensor, the MEMS pressure sensor may have a simple membrane that is exposed to the cavity 311 on one side and a back cavity on the other side having a predetermined pressure. Changes in the pressure of cavity 311 result in relative movement of the membrane of the pressure sensor. When the rate of change or absolute value of the MEMS pressure sensor changes by more than a threshold, a breach in an exterior bonded wall of the MEMS accelerometer may be determined. In some embodiments, it may be possible to distinguish between breaches in the exterior bonded wall 308 (e.g., between cavity 309 and cavity 311) and exterior bonded wall 310 (e.g., between cavity 311 and the external environment) as a breach in exterior bonded wall 308 should not result in the pressure within cavity 311 reaching atmospheric pressure. In this manner, a relatively simple and low-power MEMS pressure sensor may be utilized to identify breaches in the integrity of the cavities of the MEMS accelerometer.

In an exemplary embodiment where the pressure-sensitive sensor 312 is a Pirani gauge, where the change in the pressure in cavity 311 is identified based on a change in the output of the signal from the Pirani gauge by measuring a variation of a resistivity of the Pirani gauge based on larger power dissipation due to higher pressure (or lower power dissipation due to lower pressure). When the rate of change or absolute value of the Pirani gauge output changes by more than a threshold, a breach in an exterior bonded wall of the MEMS accelerometer may be determined. In some embodiments, it may be possible to distinguish between breaches in the exterior bonded wall 308 (e.g., between cavity 309 and cavity 311) and exterior bonded wall 310 (e.g., between cavity 311 and the external environment) as a breach in exterior bonded wall 308 should not result in the pressure within cavity 311 reaching atmospheric pressure. In this manner, a relatively simple and low-power Pirani gauge may be utilized to identify breaches in the integrity of the cavities of the MEMS accelerometer.

As is depicted in FIG. 3, in some implementations an additional sensor 314 may be located proximate to the combined cavities 309 and 311 to supplement the sensing performed by pressure-sensitive sensor(s) 312. An additional sensor 314 may be of a variety of sensor types that may provide useful information in assessing the pressure within the cavity structure. For example, an additional sensor may be a sensor such as an additional pressure-sensitive sensor, a temperature sensor, or a humidity sensor. In an example of an additional pressure-sensitive sensor, the sensor may provide rough estimates (e.g., at device start up and periodically thereafter) of the pressure in the external environment, for example, where a typical end-use application of a sensor may have a variety of pressures in the external environment. It may not be necessary to perform pressure sensing of the external environment with a frequency of sensing within the cavity. In an example of a temperature sensor, a measured temperature may be utilized to determine whether a change in pressure sensed by pressure-sensitive sensor 312 within cavity 311 is due to a corresponding change in temperature, preventing false warnings or error indications and adjusting the measured pressure appropriately. A moisture or humidity sensor may be used to determine if an identified breach of the cavity 309 and possible exposure of the MEMS environment is likely to result in the exposure of the MEMS accelerometer structures to significant moisture, which in turn is likely to cause stiction and limit movement. In the embodiment of FIG. 3, the additional sensor 314 is depicted proximate to be outside of the cavities 309 and 311 on a substrate 322 of the MEMS device, although in other embodiments such an additional sensor may be located in one of the cavities (e.g., cavity 311) for supplementary sensors such as temperature or moisture/humidity sensors. In other instances, an additional sensor 314 may be located elsewhere on or adjacent to other MEMS packaging or may be received as a signal from another component in an end-use assembly.

Surrounding cavity 309 including the MEMS accelerometers 302-306 with a second cavity 311 and bonded exterior wall 310 provides an additional benefit of limiting the likelihood that the MEMS cavity 309 loses its hermetic seal in a manner that results in catastrophic damage to the MEMS accelerometers that renders them entirely non-functional. For example, if only the bonded exterior wall 310 is breached such that the cavity 311 pressure measured by pressure-sensitive sensor 312 approaches the external pressure, it may be unlikely that the internal MEMS cavity 309 is also breached, allowing a temporary use of the MEMS accelerometers 302-306 in a "safe" mode where the sensor operation is supplemented or monitored to prevent immediate and absolute loss of MEMS accelerometer outputs. Similarly, if only the internal bonded exterior wall 308 is breached, causing the pressure between cavities 309 and 311 to equalize, the MEMS accelerometers may be operated in the safe mode with compensation for the modified pressure.

Figure 4:
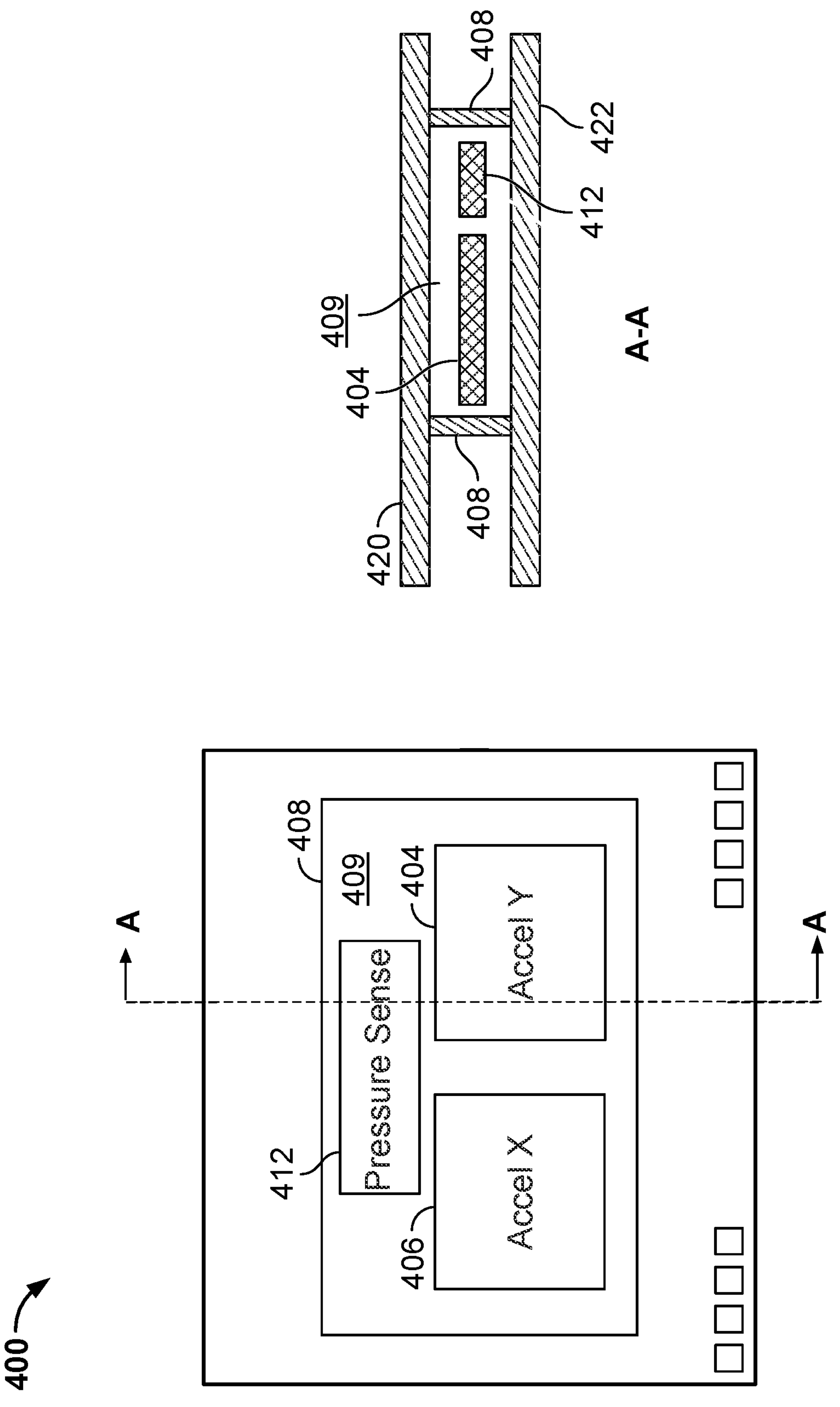
FIG. 4 depicts an exemplary MEMS accelerometer package including integrated pressure sensing in accordance with an embodiment of the present disclosure.

FIG. 4 depicts an exemplary MEMS accelerometer package 400 including integrated pressure sensing in accordance with an embodiment of the present disclosure. A section view A-A of the MEMS accelerometer package 400 is also depicted in FIG. 4. In the embodiment depicted in FIG. 4, like numbered components (e.g., y-axis MEMS accelerometer 304 vs. y-axis MEMS accelerometer 404, cavity 309 vs. cavity 409, etc.) correspond to similar structures and functions as those described in FIG. 3. Although FIG. 4 will be described in the context of a particular application and system components, it will be understood that the configuration of FIG. 4 may be utilized with a variety of MEMS sensor types, MEMS accelerometer configurations (e.g., from one to any number of axes), manufacturing techniques and component configurations (e.g., shared cap and substrate as described, and/or multiple combined or bonded dies or chips), pressure sensing techniques (e.g., direct and/or indirect techniques), and additional sensors (e.g., temperature, moisture, etc.), whether or not specifically depicted herein. Although particular components are depicted and described in FIG. 4, it will be understood that components may be added, removed, substituted, or modified in accordance with the present disclosure. For example, in some embodiments multiple pressure-sensitive sensors (e.g., having different resolutions) may be included within the pressure sensing cavity, additional sensors (e.g., temperature or moisture sensors) may be included within or outside of the pressure sensing cavity, multiple pressure sensing cavities may collectively surround the MEMS accelerometers, or there may be multiple levels of nested pressure sensing cavities. In the example depicted in FIG. 4, a two axis MEMS accelerometer package 400 (e.g., including y-axis accelerometer 404 and x-axis accelerometer 406) may be surrounded by exterior wall 408, cap 420, and substrate 422 to define a first cavity 409. A pressure-sensitive sensor 412 is located within cavity 409 with the accelerometers 404 and 406. In the embodiment depicted in FIG. 4, an additional sensor (e.g., a temperature sensor) is not depicted but may be present in some embodiments.

In the embodiment depicted in FIG. 4, the pressure-sensitive sensor 412 is co-located with the accelerometers 404 and 406 within the accelerometer cavity 409. Such a configuration may provide an accurate analysis of an exact pressure within the cavity 409, since the pressure within cavity 409 should equalize within all portions of the cavity if there is a breakage in the bonded exterior wall 408. However, the ability of the pressure-sensitive sensor 412 to sense a change in pressure due to such breakage may be compromised if an initial pressure within cavity 409 does not differ significantly from atmospheric pressure, for example, by having a pressure that is less than 400 mBar or higher than 1400 mBar in end-use applications where the MEMS accelerometer is likely to be used in an environment where the pressure is likely to be at or near atmospheric pressure. In this manner, as the pressure within cavity 409 equalizes to atmospheric pressure from the initial higher or lower pressure due to a breach in bonded exterior wall 408, the pressure-sensitive sensor 412 will be able to easily identify the change in pressure.

Figure 5:
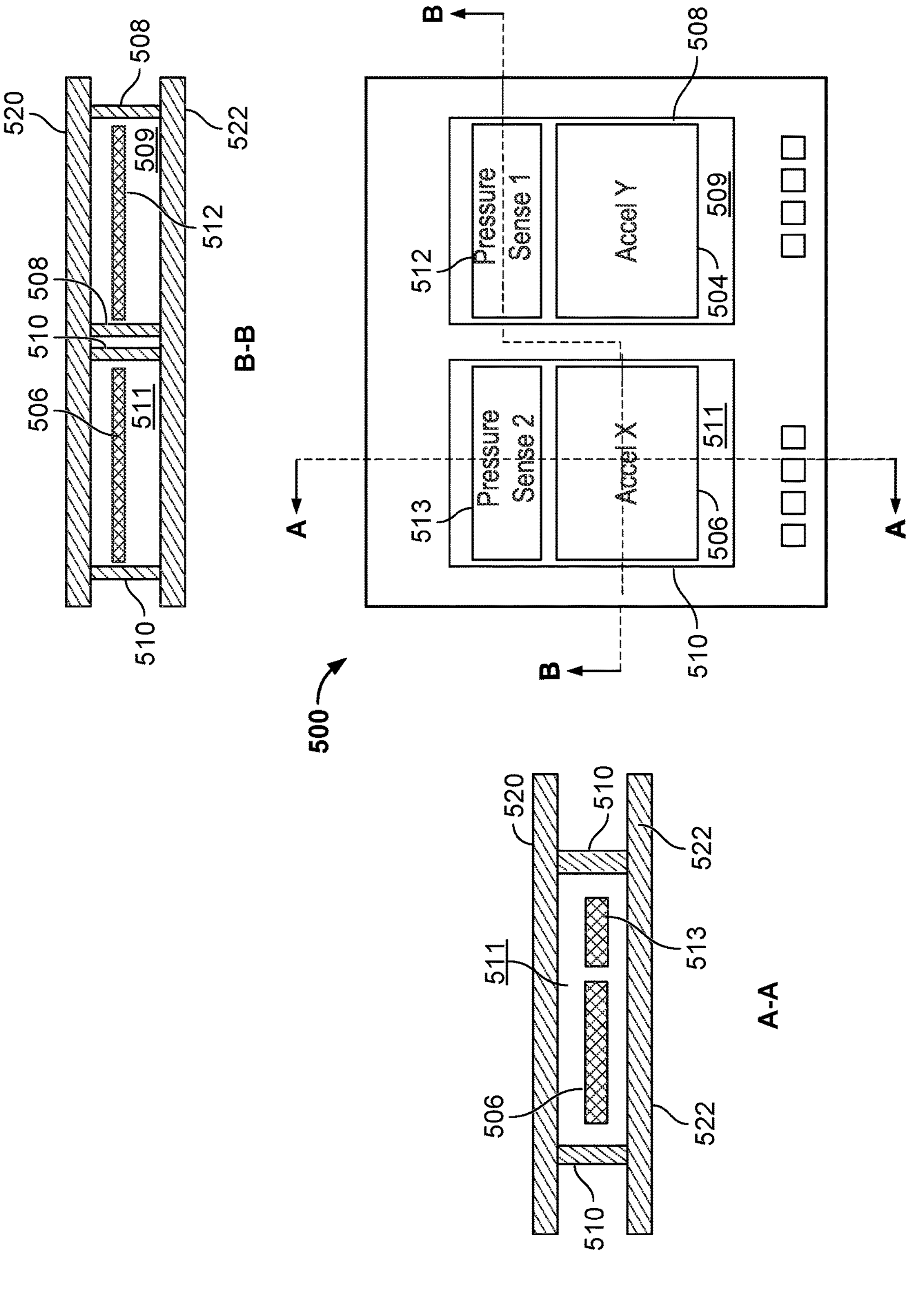
FIG. 5 depicts an exemplary MEMS accelerometer package including multiple integrated pressure sensing cavities in accordance with an embodiment of the present disclosure.

FIG. 5 depicts an exemplary MEMS accelerometer package 500 including multiple integrated pressure sensing cavities in accordance with an embodiment of the present disclosure. Section views A-A and B-B of the MEMS accelerometer package 500 are also depicted in FIG. 5. In the embodiment depicted in FIG. 5, like numbered components (e.g., y-axis MEMS accelerometer 304 or 404 vs. y-axis MEMS accelerometer 504, cavity 309 or 409 vs.

cavity 509, etc.) correspond to similar structures and functions as those described in FIGS. 3-4. Although FIG. 5 will be described in the context of a particular application and system components, it will be understood that the configuration of FIG. 5 may be utilized with a variety of MEMS sensor types, MEMS accelerometer configurations (e.g., from one to any number of axes), manufacturing techniques and component configurations (e.g., shared cap and substrate as described, and/or multiple combined or bonded dies or chips), pressure sensing techniques (e.g., direct and/or indirect techniques), and additional sensors (e.g., temperature, moisture, etc.), whether or not specifically depicted herein. Although particular components are depicted and described in FIG. 5, it will be understood that components may be added, removed, substituted, or modified in accordance with the present disclosure. For example, in some embodiments multiple pressure-sensitive sensors (e.g., having different resolutions) may be included within the pressure sensing cavities, additional sensors (e.g., temperature or moisture sensors) may be included within or outside of the pressure sensing cavities, multiple pressure sensing cavities may collectively surround the MEMS accelerometers, or there may be multiple levels of nested pressure sensing cavities. In the example depicted in FIG. 5, a two axis MEMS accelerometer package 500 (e.g., including y-axis accelerometer 504 and x-axis accelerometer 506) may have each of the accelerometer structures 504 and 506 surrounded by respective structural components to form respective cavities 509 (e.g., for y-axis accelerometer 504) and 511 (e.g., for x-axis accelerometer 506). The y-axis accelerometer 504 may be located in cavity 509, which in turn is defined by bonded exterior wall 508, cap 520, and substrate 522. The x-axis accelerometer 506 may be located in cavity 511, which in turn is defined by bonded exterior wall 510, cap 520, and substrate 522. Each cavity 509 and 511 includes a pressure-sensitive sensor located therein, with pressure-sensitive sensor 512 co-located in the cavity 509 with y-axis accelerometer 504 and pressure-sensitive sensor 513 co-located in the cavity 511 with x-axis accelerometer 506. In the embodiment depicted in FIG. 5, an additional sensor (e.g., a temperature sensor) is not depicted but may be present in some embodiments.

In the exemplary embodiment of FIG. 5, each of the MEMS accelerometers is located in its own sealed cavity with its own corresponding pressure-sensitive sensor, although in some embodiments multiple MEMS accelerometers may be located in a single cavity while one or more MEMS accelerometers are located in a different cavity (e.g., with a high-G accelerometer located in a separate cavity from low-and-medium-G accelerometers, or in-plane x-axis and y-axis MEMS accelerometers located in a common cavity and an out-of-plane x-axis accelerometer located in a separate cavity). In an embodiment with pressure-sensitive sensors 512 and 513 located in cavities 509 and 511 with respective MEMS accelerometers 504 and 506, monitoring for a breach in either of the bonded exterior walls 508 or 510 defining the cavities 509 and 511 may be performed based on relative changes in pressure sensed by pressure-sensitive sensors 512 and 513. For example, in the absence of a breach of either cavity, the pressure within the respective cavities should change in a similar manner due to changes in temperature and the like. Differences in the change of relative pressures sensed by the pressure-sensitive sensors 512 and 513 may thus be utilized to identify conditions such as a breakage in a bonded exterior wall 508 or 510.

In some embodiments, the relative dimensions and selection of components for the MEMS accelerometers 504 and 506, pressure-sensitive sensors 512 and 513, and cavity-defining walls, cap, and substrate may be selected such that the pressure sensors 512 and 513 should initially be operating under nearly identical conditions of pressure within an equally sized cavity volume. Changes in the external environment such as changes in temperature or aging will affect each pressure-sensitive sensor 512 and 513 in an identical manner. Only when one of the bonded exterior walls is breached providing a fluidic path with the external environment should the outputs of pressure-sensitive sensors 512 and 513 diverge. The mechanism based on comparison allows detection of pressure changes (e.g., a one percent or greater change), thus detecting a breach of one of the external walls 508 or 510.

Figure 6:
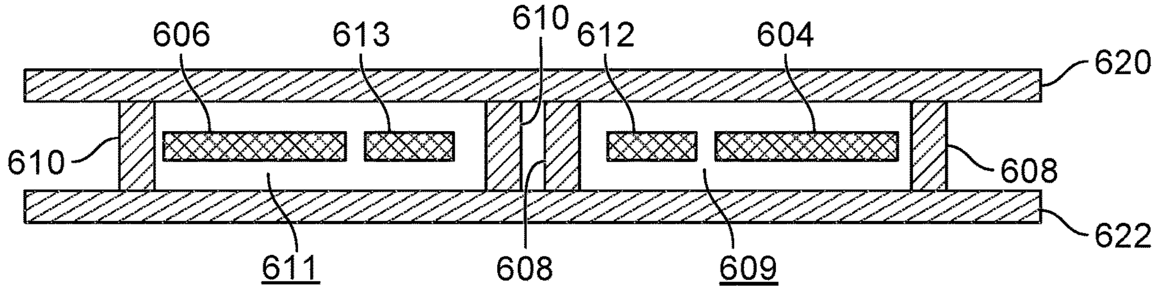
FIG. 6 depicts an exemplary MEMS accelerometer package including multiple integrated pressure sensing cavities in accordance with an embodiment of the present disclosure.
Figure 6:
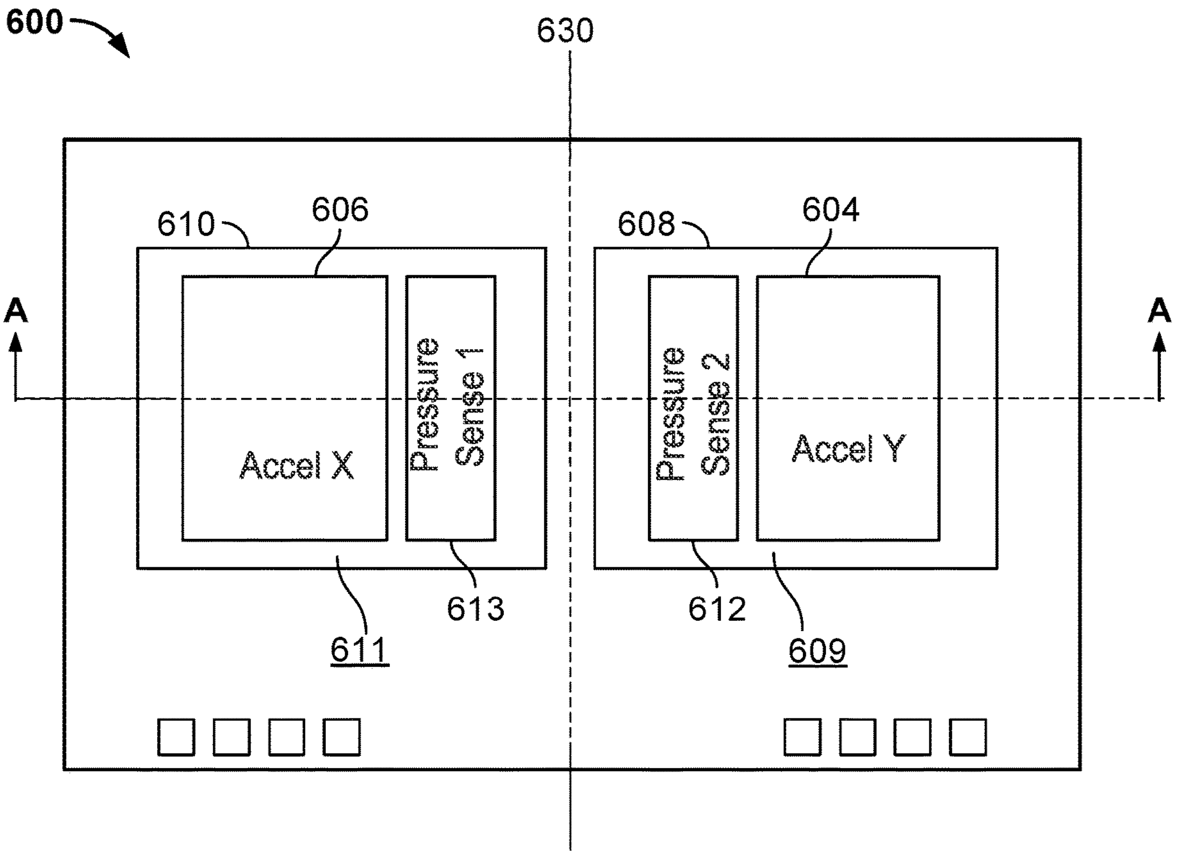

FIG. 6 depicts an exemplary MEMS accelerometer package 600 including multiple integrated pressure sensing cavities in accordance with an embodiment of the present disclosure. Section view A-A of the MEMS accelerometer package is also depicted in FIG. 6. In the embodiment depicted in FIG. 6, like numbered components (e.g., y-axis MEMS accelerometer 304, 404, or 504 vs. y-axis MEMS accelerometer 604, cavity 309, 409, or 509 vs. cavity 609, etc.) correspond to similar structures and functions as those described in FIGS. 3-5. Although FIG. 6 will be described in the context of a particular application and system components, it will be understood that the configuration of FIG. 6 may be utilized with a variety of MEMS sensor types, MEMS accelerometer configurations (e.g., from one to any number of axes), manufacturing techniques and component configurations (e.g., shared cap and substrate as described, and/or multiple combined or bonded dies or chips), pressure sensing techniques (e.g., direct and/or indirect techniques), and additional sensors (e.g., temperature, moisture, etc.), whether or not specifically depicted herein. Although particular components are depicted and described in FIG. 6, it will be understood that components may be added, removed, substituted, or modified in accordance with the present disclosure. For example, in some embodiments multiple pressure-sensitive sensors (e.g., having different resolutions) may be included within the pressure sensing cavities, additional sensors (e.g., temperature or moisture sensors) may be included within or outside of the pressure sensing cavity, multiple pressure sensing cavities may collectively surround the MEMS accelerometers, or there may be multiple levels of nested pressure sensing cavities. In the example depicted in FIG. 6, a two axis MEMS accelerometer package 600 (e.g., including y-axis accelerometer 604 and x-axis accelerometer 606) may have each of the accelerometer structures 604 and 606 surrounded by respective structural components to form respective cavities 609 (e.g., for y-axis accelerometer 604) and 611 (e.g., for x-axis accelerometer 606). The y-axis accelerometer 604 may be located in cavity 609, which in turn is defined by bonded exterior wall 608, cap 620, and substrate 622. The x-axis accelerometer 606 may be located in cavity 611, which in turn is defined by bonded exterior wall 610, cap 620, and substrate 622. Each cavity 609 and 611 includes a pressure-sensitive sensor located therein, with pressure-sensitive sensor 612 co-located in the cavity 609 with y-axis accelerometer 604 and pressure-sensitive sensor 613 co-located in the cavity 611 with x-axis accelerometer 606. In the embodiment depicted in FIG. 6, an additional sensor (e.g., a temperature sensor) is not depicted but may be present in some embodiments.

In the embodiment of FIG. 6, the selection of components and the position and orientation of components may be optimized such that relative measurement outputs of pressure-sensitive sensors 612 and 613 should be close to equal in the absence of a breach of one of the cavities 609 or 611. For example, the pressure-sensitive components may be identical resonator structures with a suspended mass oriented in the same direction and orientation, placed as close as possible one to the other in order to minimize any difference between the two (or in other embodiments such as pressure sensors or Pirani gauges, may be oriented in an identical location and direction) about a central or close to central symmetry line 630 of the MEMS accelerometer package 600 and relatively close to the central symmetry line 630 (e.g., with only suitable space for the pressure-sensitive sensor and bonded exterior wall). In this manner, any temperature gradients or stress/strain profiles (e.g., which may impact a sensed output in some instances) experienced by the MEMS accelerometer package 600 are likely to be very similar for each of the respective pressure-sensitive sensors 612 and 613. MEMS accelerometers 604 and 606 may be selected, positioned, and oriented such that they occupy a similar surface area and volume within the respective cavities 609 and 611, and an initial pressure applied to each of the cavities may be identical. Accordingly, based on the sensor design, the pressure-sensitive sensors 612 and 613 should have a nearly identical absolute output as well as change in response to output.

In any of the above-described embodiments, one or more calibration operations may be performed during manufacturing and/or in the field. In examples of calibration operations that may be performed during operation, the pressure in the cavity(ies) may be changed directly (e.g., by adding or removing gas from a fixed volume, gettering, or outgassing) or indirectly (e.g., by modifying a temperature of the sensor package) under controlled conditions to determine both absolute outputs of the pressure-sensitive sensors at particular pressures, relative responses between multiple pressure-sensitive sensors, and output responses to changes in pressure. During sensor operation, the output(s) of the pressure-sensitive sensor(s) may be measured periodically such as during device start up or while the accelerometer output is inactive, to set baselines for comparison of future changes in output. In some instances small changes in output may be identified over time (e.g., falling below a very low threshold as being due to sensor drift), and may be compensated for in identifying whether an output corresponding to a pressure change merits compensation, errors, warnings and/or other mitigation.

Figure 7:
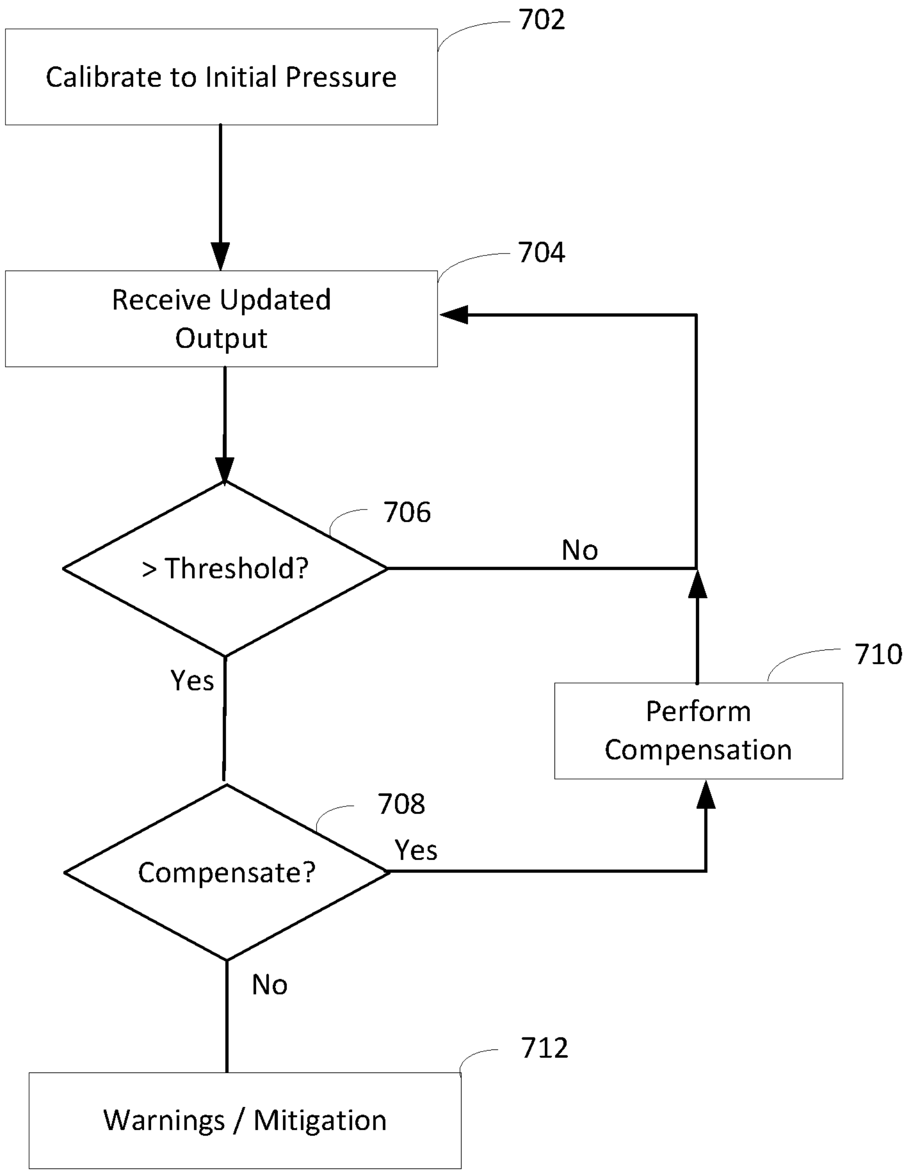
FIG. 7 depicts exemplary steps of sensing a change in pressure with a MEMS accelerometer surrounded by a pressure sensing cavity in accordance with an embodiment of the present disclosure.

FIG. 7 depicts exemplary steps of sensing a change in pressure with a MEMS accelerometer surrounded by a pressure sensing cavity in accordance with an embodiment of the present disclosure. Although particular steps are depicted in a certain order for FIG. 7, steps may be removed, modified, or substituted, and additional steps may be added in certain embodiments, and in some embodiments, the order of certain steps may be modified.

Processing may start at step 702, where at an appropriate time (e.g., during startup or periodically while the MEMS accelerometer is not outputting a signal indicating acceleration) the output of the pressure-sensitive sensor may be received and calibrated, for example to account for different temperature conditions or general drift over time. If during the calibration a change from a previous value exceeds a threshold, processing may skip the normal operation and moving into one of the error, compensation, or other mitigation modes (not depicted in FIG. 7). Once the pressure-sensitive sensor output has been calibrated, processing may continue to step 704.

At step 704, the output of the pressure-sensitive sensor may be monitored. For example, as depicted and described with respect to FIG. 3, the pressure-sensitive sensor may be located in a surrounding cavity that surrounds another cavity including one or more MEMS accelerometer structures. The pressure within the surrounding cavity may be at a different pressure than the pressure within the MEMS accelerometer cavity as well as the pressure of the external environment (e.g., for most applications, at or near atmospheric pressure). Once the value of the output of the pressure-sensitive sensor is obtained, processing may continue to step 706.

At step 706, the output of the pressure-sensitive sensor may be compared to one or more thresholds. Thresholds may be configured to be absolute (e.g., if the pressure is greater or less than a certain value), relative (e.g., if the pressure changes by more or less than a certain value), rate-of-change (e.g., if the pressure change is more than an amount per unit time), or other suitable measurements (e.g., statistical tracking over time and operation). In some instances, other signals (e.g., from a temperature sensor) may be used to modify or scale the pressure values or the thresholds. If the comparison to the threshold indicates that there are no conditions that require additional steps, processing may return to step 704 to continue monitoring the output of the pressure-sensitive sensor. If any thresholds are met, processing may continue to step 708.

At step 708, it may be determined whether it is possible to continue operation of the MEMS accelerometer. For example, certain changes in pressure may be slow enough (e.g., indicating a slow equalization of pressure) such that it may be desirable to continue operating the MEMS accelerometer for a length of time while providing a warning to replace the MEMS accelerometer. As another example, if the processing circuitry is able to distinguish between a breach between the two cavities as opposed to a breach to the external environment (e.g., based on a pressure after equalization in the surrounding cavity) it may be desired to operate temporarily while providing a warning. In such instances, processing can continue to step 710 to modify the MEMS accelerometer outputs based on an expected pressure or to change weighting of those outputs in other calculated values based on decreased precision. From step 710, monitoring may continue by returning to step 704. If continued operation is not possible, processing may continue to step 712.

At step 712, the processing circuitry may provide information to portions of the MEMS accelerometer, other sensors, or other systems/components that a seal of one of the cavities of the MEMS accelerometer has been breached and that further operation is not possible. In some instances this may involve mitigating steps, such as utilizing outputs from other sensors to approximate outputs or determinations that would otherwise be performed by the compromised MEMS accelerometer. Once this is complete, the processing may end.

Figure 8:
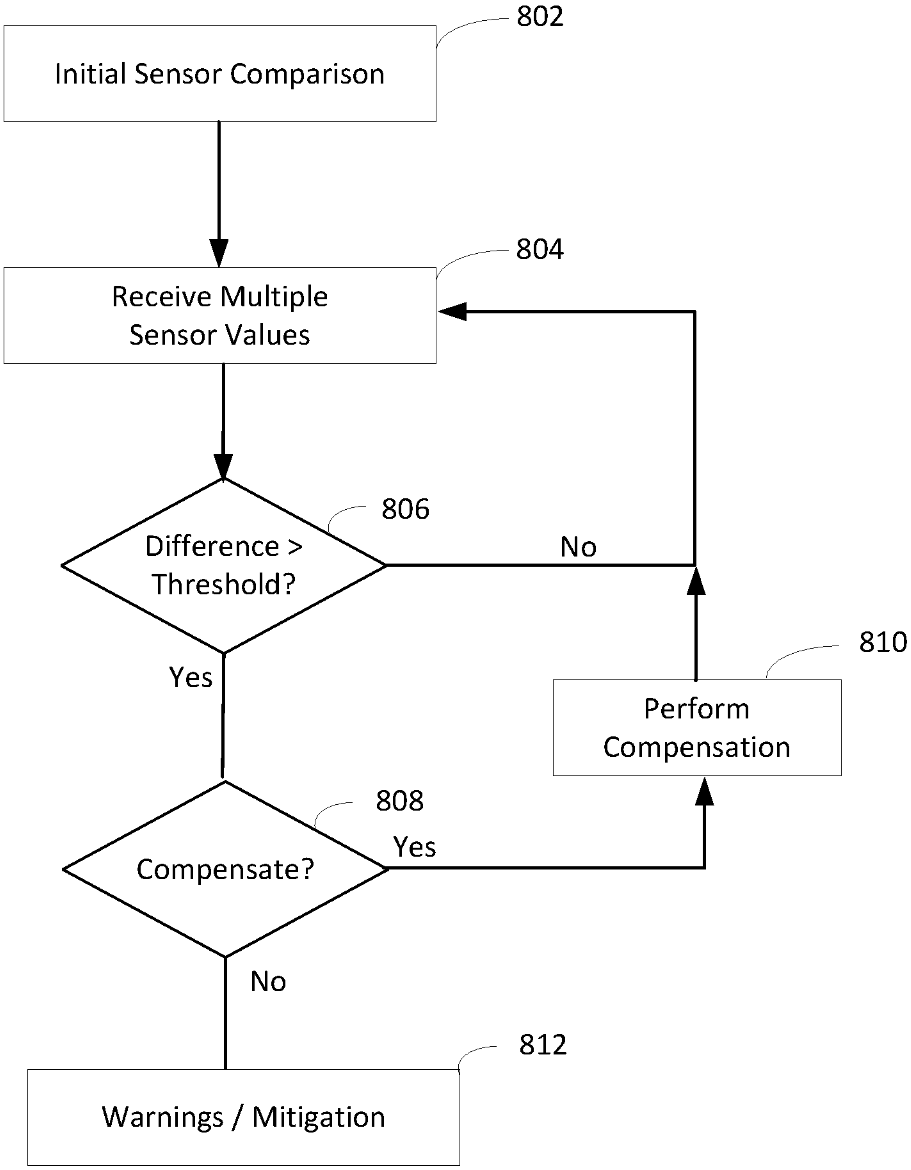
FIG. 8 depicts exemplary steps of sensing a change in pressure with multiple MEMS accelerometers having integrated pressure sensing in in accordance with an embodiment of the present disclosure.

FIG. 8 depicts exemplary steps of sensing a change in pressure with multiple MEMS accelerometers having integrated pressure sensing in in accordance with an embodiment of the present disclosure. Although particular steps are depicted in a certain order for FIG. 8, steps may be removed, modified, or substituted, and additional steps may be added in certain embodiments, and in some embodiments, the order of certain steps may be modified.

Processing may start at step 802, where at an appropriate time (e.g., during startup or periodically while the MEMS accelerometer is not outputting a signal indicating acceleration) the output of the pressure-sensitive sensors may be received and calibrated, for example to account for different temperature conditions or general drift over time. If during the calibration a change from a previous value from either pressure-sensitive sensor exceeds a threshold, processing may skip the normal operation and move into one of the error, compensation, or other mitigation modes (not depicted in FIG. 8). Once the pressure-sensitive sensor outputs have been calibrated, processing may continue to step 804.

At step 804, the outputs of the pressure-sensitive sensors may be monitored. For example, as depicted and described with respect to FIGS. 5-6, the pressure-sensitive sensors may be co-located in respective cavities with respective MEMS accelerometer structures. The configuration and selection of the pressure-sensitive sensors, MEMS accelerometer structures, cavity volumes, and relative locations and orientations of components may be such that the pressure-sensitive sensors have similar absolute values and change output values in a similar manner during normal operation in the absence of a breach of either cavity. Once the values of the outputs of the pressure-sensitive sensors are obtained, processing may continue to step 806.

At step 806, the outputs of the pressure-sensitive sensors are compared to each other, and the results of that comparison are compared to one or more thresholds. Thresholds may be configured to be absolute (e.g., if the pressure difference is greater or less than a certain value), relative (e.g., if the pressure difference changes by more or less than a certain value), rate-of-change (e.g., if the pressure difference change is more than an amount per unit time), or other suitable measurements (e.g., statistical tracking over time and operation). In some instances, other signals (e.g., from a temperature sensor) may be used to modify or scale the pressure values or the thresholds. If the comparison to the threshold indicates that there are no conditions that require additional steps, processing may return to step 804 to continue monitoring the output of the pressure-sensitive sensor. If any thresholds are met, processing may continue to step 808.

At step 808, it may be determined whether it is possible to continue operation of one or both of the MEMS accelerometers. For example, certain changes in pressure may be slow enough (e.g., indicating a slow equalization of pressure) such that it may be desirable to continue operating the MEMS accelerometer for a length of time while providing a warning to replace the MEMS accelerometer. As another example, if the processing circuitry is able to determine which of the cavities associated with which MEMS accelerometer has experienced the breach, the MEMS accelerometer that did not experience a breach of the cavity may continue to operate, at least temporarily while providing a warning. In such instances, processing can continue to step 810 to modify the MEMS accelerometer outputs based on an expected pressure or to change weighting of those outputs in other calculated values based on decreased precision. From step 810, monitoring may continue by returning to step 804. If continued operation is not possible, processing may continue to step 812.

At step 812, the processing circuitry may provide information to portions of the MEMS accelerometers, other sensors, or other systems/components that a seal of at least one of the cavities of the MEMS accelerometers has been breached and that further operation is not possible. In some instances this may involve mitigating steps, such as utilizing outputs from other sensors to approximate outputs or determinations that would otherwise be performed by the compromised MEMS accelerometer. Once this is complete, the processing may end.

The foregoing description includes exemplary embodiments in accordance with the present disclosure. These examples are provided for purposes of illustration only, and not for purposes of limitation. It will be understood that the present disclosure may be implemented in forms different from those explicitly described and depicted herein and that various modifications, optimizations, and variations may be implemented by a person of ordinary skill in the present art, consistent with the following claims.

What is claimed is:

1. A microelectromechanical system (MEMS) accelerometer, comprising:

at least one MEMS accelerometer structure located within a first sealed cavity, the first sealed cavity having a first initial pressure within a first volume defined by a cap, a substrate, and a first bonded exterior wall;

a second sealed cavity surrounding the first bonded exterior wall and defined by the cap, the substrate, and a second bonded exterior wall, wherein a second volume of the second sealed cavity is less than the first volume and a second initial pressure of the second sealed cavity is less than the first initial pressure and lower than atmospheric pressure, wherein the first bonded exterior wall defines a boundary between the first sealed cavity and the second sealed cavity;

a sensor located within the second sealed cavity and configured to output a signal that changes based on a change in pressure within the second sealed cavity; and processing circuitry configured to receive the signal and to identify a break in a sealing of the first sealed cavity based on the change in the pressure within the second sealed cavity.

2. The MEMS accelerometer of claim 1, wherein the sensor comprises a MEMS resonator.

3. The MEMS accelerometer of claim 2, wherein the MEMS resonator is forced to resonance by a drive signal from the processing circuitry to cause a movement of the MEMS resonator, wherein a power of the drive signal increases with an increase of pressure within the second sealed cavity to maintain the movement of the MEMS resonator, and wherein the processing circuitry identifies the change in the pressure based on the increased power of the drive signal.

4. The MEMS accelerometer of claim 2, wherein the MEMS resonator is forced to oscillation by a drive signal from the processing circuitry and once a desired level of oscillation is reached by the MEMS resonator the driving signal is switched off and the processing circuitry measures a decay time for the MEMS resonator to decay from the forced oscillation, and wherein the processing circuitry identifies the change in the pressure based on the decay time.

5. The MEMS accelerometer of claim 4, wherein the decay time decreases more quickly with an increase of pressure within the second sealed cavity, and wherein the processing circuitry identifies the change in the pressure based on the decay time decreasing by more than a threshold time associated with the break in the sealing of the first sealed cavity.

6. The MEMS accelerometer of claim 1, wherein the sensor comprises a Pirani gauge and wherein the processing circuitry identifies the change in the pressure based on a change in an output of the signal from the Pirani gauge by measuring a variation of a resistivity of the Pirani gauge based on larger power dissipation due to higher pressure.

7. The MEMS accelerometer of claim 1, wherein the sensor comprises a MEMS pressure sensor, and the processing circuitry identifies the change in the pressure based on a change in an output of the signal from the MEMS pressure sensor.

8. The MEMS accelerometer of claim 7, wherein the second sealed cavity includes a second volume surrounding the MEMS pressure sensor, and wherein the MEMS pressure sensor further defines a third volume located on an opposite side of a membrane of the MEMS pressure sensor from the second volume.

9. The MEMS accelerometer of claim 1, wherein the sensor comprises a first sensor, further comprising a temperature sensor located proximate to the first sealed cavity, wherein the processing circuitry further identifies the break in the sealing of the first sealed cavity based on compensating the signal from the sensor based on a temperature change sensed by the temperature sensor.

10. The MEMS accelerometer of claim 9, wherein the first sensor comprises a MEMS resonator, a MEMS pressure sensor, or a Pirani gauge.

11. The MEMS accelerometer of claim 1, wherein the first initial pressure is approximately atmospheric pressure and the second initial pressure is less than half of the first initial pressure.

12. The MEMS accelerometer of claim 11, wherein the first initial pressure is approximately atmospheric pressure and the second initial pressure is at least an order of magnitude less than the first initial pressure.

13. The MEMS accelerometer of claim 1, wherein the at least one MEMS accelerometer structure comprises at least three MEMS accelerometer structures, and wherein a first MEMS accelerometer structure is an x-axis accelerometer, a second MEMS accelerometer structure is a y-axis accelerometer, and wherein a third MEMS accelerometer structure is a z-axis accelerometer.

14. The MEMS accelerometer of claim 1, wherein the at least one MEMS accelerometer structure comprises at least one multi-axis accelerometer structure.

15. The MEMS accelerometer of claim 1, wherein the at least one MEMS accelerometer structure comprises a plurality of MEMS accelerometer structures, and wherein a first MEMS accelerometer structure is a low-G accelerometer and a second MEMS accelerometer structure is a high-G accelerometer.

16. The MEMS accelerometer of claim 15, wherein the low-G accelerometer senses a first acceleration of less than 30 Gee and wherein a third MEMS accelerometer comprises a medium-G accelerometer that senses a second acceleration of greater than 30 Gee.

17. The MEMS accelerometer of claim 16, wherein the high-G accelerometer senses a third acceleration of more than 120 Gee.

18. The MEMS accelerometer of claim 1, wherein the second volume of the second sealed cavity is defined between the first and second bonded exterior walls.

19. The MEMS accelerometer of claim 1, wherein the second volume is less than half of the first volume.

20. A method for identifying a breach of a microelectromechanical system (MEMS) accelerometer cavity, comprising:

receiving a first output signal at a first time from a first sensor located within a first sealed cavity having a first initial pressure, wherein the first sealed cavity has a first bonded exterior wall that surrounds a second bonded exterior wall that defines a boundary between the first sealed cavity and a second sealed cavity, wherein the second bonded exterior wall defines a second sealed cavity having a second initial pressure, wherein the first initial pressure of the first sealed cavity is less than the second initial pressure and lower than atmospheric pressure, the first sealed cavity having a first volume and the second sealed cavity having a second volume less than the first volume;

associating the first output signal with the first initial pressure;

receiving a second output signal at a second time from the first sensor;

comparing the second output signal to the first output signal; and determining, based on the comparing, that one of the first sealed cavity or the second sealed cavity has been breached.

* * * * *